United States Patent
Bennati

(10) Patent No.: US 11,822,682 B2
(45) Date of Patent: Nov. 21, 2023

(54) METHOD, APPARATUS, AND COMPUTER PROGRAM PRODUCT FOR QUANTIFYING THE PRIVACY RISK OF TRAJECTORY DATA

(71) Applicant: HERE GLOBAL B.V., Eindhoven (NL)

(72) Inventor: Stefano Bennati, Zurich (CH)

(73) Assignee: HERE GLOBAL B.V., Eindhoven (NL)

( * ) Notice: Subject to any disclaimer, the term of this patent is extended or adjusted under 35 U.S.C. 154(b) by 276 days.

(21) Appl. No.: 17/302,961

(22) Filed: May 17, 2021

(65) Prior Publication Data

US 2022/0366062 A1 Nov. 17, 2022

(51) Int. Cl.
*G06F 21/62* (2013.01)
*G06F 21/57* (2013.01)

(52) U.S. Cl.
CPC ........ *G06F 21/6209* (2013.01); *G06F 21/577* (2013.01); *G06F 2221/034* (2013.01)

(58) Field of Classification Search
CPC .............. G06F 21/6209; G06F 21/577; G06F 2221/034
See application file for complete search history.

(56) References Cited

U.S. PATENT DOCUMENTS

| | | | |
|---|---|---|---|
| 10,664,616 B2 | 5/2020 | Herlocker et al. | |
| 2019/0272389 A1 | 9/2019 | Viente et al. | |
| 2020/0162901 A1* | 5/2020 | Liu | H04W 12/02 |
| 2020/0271458 A1 | 8/2020 | Berry et al. | |
| 2021/0019425 A1 | 1/2021 | Ostadzadeh et al. | |
| 2021/0372801 A1* | 12/2021 | Bennati | G01C 21/387 |
| 2022/0225086 A1* | 7/2022 | Fu | H04W 12/02 |

OTHER PUBLICATIONS

Chow et al., "Trajectory Privacy in Location-based Services and Data Publication", pp. 19-29, ACM SIGKDD Explorations Newsletter vol. 13 Issue 1, Jun. 2011 (Year: 2011).*
Camenisch et al., "Zone Encryption with Anonymous Authentication for V2V Communication", 2020 IEEE European Symposium on Security and Privacy (EuroS&P), (Sep. 7-11, 2020), 58 pages.
Pinnaka, C., "Quantification of User Privacy Loss", Master Thesis, School of Electrical Engineering at KTH Royal Institute of Technology in Stockholm, (Dec. 22, 2012), 68 pages.

(Continued)

*Primary Examiner* — Thaddeus J Plecha
(74) *Attorney, Agent, or Firm* — ALSTON & BIRD LLP

(57) ABSTRACT

Embodiments described herein relate measuring and quantifying the privacy risk for disclosure of trajectory data based on one or more attributes of the trajectory data. Methods may include: receiving probe data points defining at least one trajectory; identifying attributes of the at least one trajectory, where the identified attributes include values for respective trajectories; calculating a privacy risk associated with the at least one trajectory based, at least in part, on a distribution of values of the identified attributes, where the privacy risk includes a measure of difficulty in identifying a source of the at least one trajectory; and providing information associated with the at least one trajectory for location-based services in response to the privacy risk satisfying a predetermined value.

22 Claims, 5 Drawing Sheets

(56) References Cited

OTHER PUBLICATIONS

Zan et al., "Linking Anonymous Location Traces Through Driving Characteristics", CODASPY '13, Proceedings of the Third ACM Conference on Data and Application Security and Privacy, (Feb. 2013), 8 pages.
Extended European Search Report for European Application No. 22173461.9 dated Oct. 4, 2022, 6 pages.

* cited by examiner

| Trajectory ID | Coordinates | IP | Manufacturer | Year |
|---|---|---|---|---|
| Trajectory1 | 46.49; -84.27 | 1.1.1.1 | Blue | 2015 |
| Trajectory1 | 46.50; -84.29 | 1.1.1.1 | Blue | 2015 |
| Trajectory1 | 46.51; -84.28 | 1.1.1.1 | Blue | 2015 |
| Trajectory2 | 47.33; -63.21 | 2.2.2.2 | Green | 2018 |
| Trajectory2 | 47.31; -63.20 | 2.2.2.2 | Green | 2018 |
| Trajectory3 | 51.97; 12.23 | 3.3.3.3 | Red | 2015 |
| Trajectory3 | 51.98; 12.22 | 3.3.3.3 | Red | 2015 |
| Trajectory4 | 41.11; 8.63 | 4.4.4.4 | Green | 2020 |
| Trajectory4 | 41.13; 8.63 | 4.4.4.4 | Green | 2020 |

FIG. 3

METHOD, APPARATUS, AND COMPUTER PROGRAM PRODUCT FOR QUANTIFYING THE PRIVACY RISK OF TRAJECTORY DATA

TECHNOLOGICAL FIELD

An example embodiment of the present disclosure relates to measuring and quantifying the privacy risk for disclosure of trajectory data, and more particularly, to measuring and quantifying the privacy risk for disclosure of trajectory data based on one or more attributes of the trajectory data.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for measuring and quantifying the privacy risk for disclosure of trajectory data, and more particularly, for measuring and quantifying the privacy risk for disclosure of trajectory data based on one or more attributes of the trajectory data. According to an example embodiment, an apparatus is provided including at least one processor and at least one memory including computer program code, the at least one memory and computer program code configured to, with the processor, cause the apparatus to at least: receive probe data points defining at least one trajectory; identify attributes of the at least one trajectory, where the identified attributes include values for respective trajectories; calculate a privacy risk associated with the at least one trajectory based, at least in part, on a distribution of values of the identified attributes, where the privacy risk includes a measure of difficulty in identifying a source of the at least one trajectory; and provide information associated with the at least one target trajectory for location-based services in response to the privacy risk satisfying a predetermined value.

According to some embodiments, the attributes of the at least one trajectory include two or more types of attributes, where at least one type of attribute includes a categorical attribute of discrete values. According to some embodiments, at least one type of attribute includes a measured property, where the measured property type of attribute includes floating point values. Causing the apparatus of some embodiments to identify attributes of the at least one trajectory may further include causing the apparatus to: combine at least two types of attributes of the two or more types of attributes into a combined attribute, where causing the apparatus to calculate a privacy risk associated with the at least one trajectory based, at least in part, on a distribution of values of the identified attributes includes causing the apparatus to calculate a privacy risk associated with the at least one trajectory based, at least in part, on a distribution of values of the combined attribute.

The apparatus of some embodiments is caused to re-calculate the privacy risk associated with the at least one trajectory based, at least in part, on the combined attribute. According to some embodiments, causing the apparatus to calculate a privacy risk associated with the at least one trajectory based, at least in part, on a distribution of values of the identified attributes includes causing the apparatus to: determine a distribution of values for at least one of the two or more types of attributes; discard the at least one of the two or more types of attributes in response to the distribution of values failing to satisfy a predefined threshold; and calculate a privacy risk associated with the at least one trajectory based, at least in part, on a distribution of values of the identified attributes without the discarded at least one of the two or more types of attributes.

Embodiments provided herein include a computer program product having at least one non-transitory computer-readable storage medium having computer-executable program code instructions stored therein, the computer-executable program code portions including program code instructions configured to: receive probe data points defining at least one trajectory; identify attributes of the at least one trajectory, where the identified attributes include values for respective trajectories; calculate a privacy risk associated with the at least one trajectory based, at least in part, on a distribution of values of the identified attributes, where the privacy risk includes a measure of difficulty in identifying a source of the at least one trajectory; and provide information associated with the at least one trajectory for location-based services in response to the privacy risk satisfying a predetermined value.

According to some embodiments, the attributes of the at least one trajectory include two or more types of attributes, where at least one type of attribute includes a categorical attribute of discrete values. At least one type of attribute includes a measured property, where the measured property type of attribute includes floating point values. The program code instructions to identify attributes of the at least one trajectory of some embodiments further includes program code instructions to: combine at least two types of attributes of the two or more types of attributes into a combined attribute, where the program code instructions to calculate a privacy risk associated with the at least one trajectory based, at least in part, on a distribution of values of the identified attributes includes program code instructions to calculate a privacy risk associated with the at least one trajectory based, at least in part, on a distribution of values of the combined attribute.

According to some embodiments, the program code instructions to combine at least two types of attributes of the two or more types of attributes into a combined attribute include program code instructions to calculate a hash on values of the combined at least two types of attributes. Embodiments optionally include program code instructions to re-calculate the privacy risk associated with the at least one trajectory based, at least in part, on the combined attribute. According to some embodiments, the program code instructions to calculate a privacy risk associated with the at least one trajectory based, at least in part, on a distribution of values of the identified attributes include program code instructions to: determine a distribution of values for at least one of the two or more types of attributes; discard the at least one of the two or more types of attributes in response to the distribution of values failing to satisfy a predetermined threshold; and calculate a privacy risk associated with the at least one trajectory based, at least in part, on a distribution of values of the identified attributes without the discarded at least one of the two or more types of attributes.

Embodiments provided herein include a method including: receiving probe data points defining at least one trajectory; identifying attributes of the at least one trajectory, where the identified attributes include values for respective trajectories; calculating a privacy risk associated with the at least one trajectory based, at least in part, on a distribution of values of the identified attributes, where the privacy risk includes a measure of difficulty in identifying a source of the at least one trajectory; and providing information associated with the at least one trajectory for location-based services in response to the privacy risk satisfying a predetermined value.

According to some embodiments, the attributes of the at least one trajectory include two or more types of attributes, where at least one type of attribute includes a categorical attribute of discrete values. According to some embodiments, at least one type of attribute includes a measured property, where the measured property type of attribute includes floating point values. Identifying attributes of the at least one trajectory, in some embodiments, includes: combining at least two types of attributes of the two or more types of attributes into a combined attribute, where calculating a privacy risk associated with the at least one trajectory based, at least in part, on a distribution of values of the identified attributes includes calculating a privacy risk associated with the at least one trajectory based, at least in part, on a distribution of values of the combined attribute.

According to some embodiments, combining at least two types of attributes of the two or more types of attributes into a combined attribute includes calculating a hash on values of the combined at least two types of attributes. Calculating a privacy risk associated with the at least one trajectory based, at least in part, on a distribution of values of the identified attributes includes, in some embodiments: determining a distribution of values for at least one of the two or more types of attributes; discarding the at least one of the two or more types of attributes in response to the distribution of values failing to satisfy a predetermined value; and calculating a privacy risk associated with the at least one trajectory based, at least in part, on a distribution of values of the identified attributes without the discarded at least one of the two or more types of attributes.

Methods of some embodiments include prohibiting provision of information associated with the at least one trajectory for location-based services in response to the privacy risk failing to satisfy a predetermined value. The at least one trajectory of some embodiments includes a plurality of trajectories, where methods optionally include: calculating a privacy risk associated with the plurality of trajectories based, at least in part, on a distribution of values of the identified attributes across a dataset of the plurality of trajectories, where providing information associated with the at least one trajectory for location based services in response to the privacy risk satisfying the predetermined value includes providing information associated with the dataset of the plurality of trajectories for location-based services in response to the privacy risk associated with the plurality of trajectories satisfying the predetermined value.

Embodiments provided herein include an apparatus including: means for receiving probe data points defining at least one trajectory; means for identifying attributes of the at least one trajectory, where the identified attributes include values for respective trajectories; means for calculating a privacy risk associated with the at least one trajectory based, at least in part, on a distribution of values of the identified attributes, where the privacy risk includes a measure of difficulty in identifying a source of the at least one trajectory; and means for providing information associated with the at least one trajectory for location-based services in response to the privacy risk satisfying a predetermined value.

According to some embodiments, the attributes of the at least one trajectory include two or more types of attributes, where at least one type of attribute includes a categorical attribute of discrete values. According to some embodiments, at least one type of attribute includes a measured property, where the measured property type of attribute includes floating point values. The means for identifying attributes of the at least one trajectory, in some embodiments, includes: means for combining at least two types of attributes of the two or more types of attributes into a combined attribute, where calculating a privacy risk associated with the at least one trajectory based, at least in part, on a distribution of values of the identified attributes includes means for calculating a privacy risk associated with the at least one trajectory based, at least in part, on a distribution of values of the combined attribute.

According to some embodiments, means for combining at least two types of attributes of the two or more types of attributes into a combined attribute includes means for calculating a hash on values of the combined at least two types of attributes. The means for calculating a privacy risk associated with the at least one trajectory based, at least in part, on a distribution of values of the identified attributes includes, in some embodiments: means for determining a distribution of values for at least one of the two or more types of attributes; means for discarding the at least one of the two or more types of attributes in response to the distribution of values failing to satisfy a predetermined value; and means for calculating a privacy risk associated with the at least one trajectory based, at least in part, on a distribution of values of the identified attributes without the discarded at least one of the two or more types of attributes.

BRIEF DESCRIPTION OF THE DRAWINGS

Figure 1:
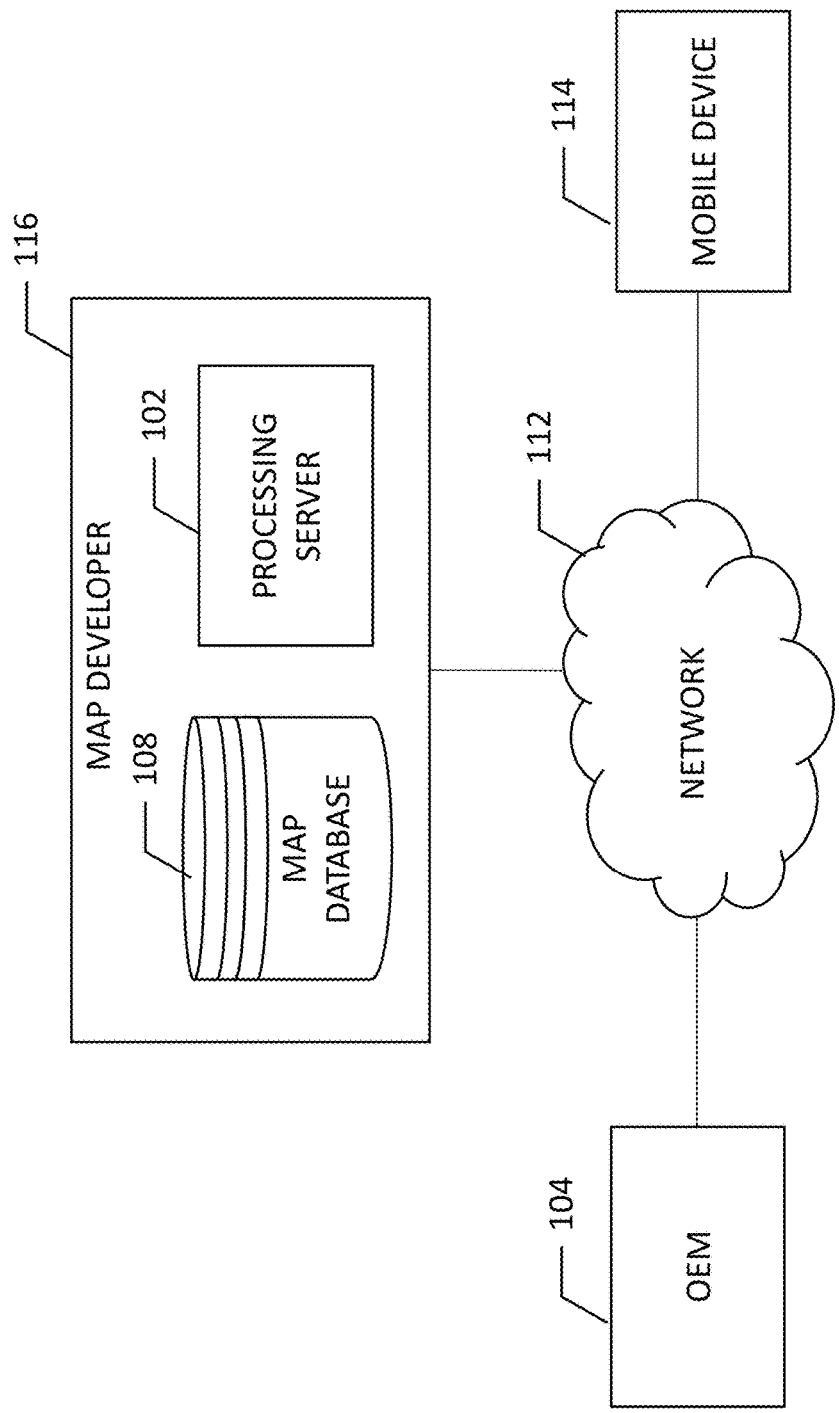
Figure 2:
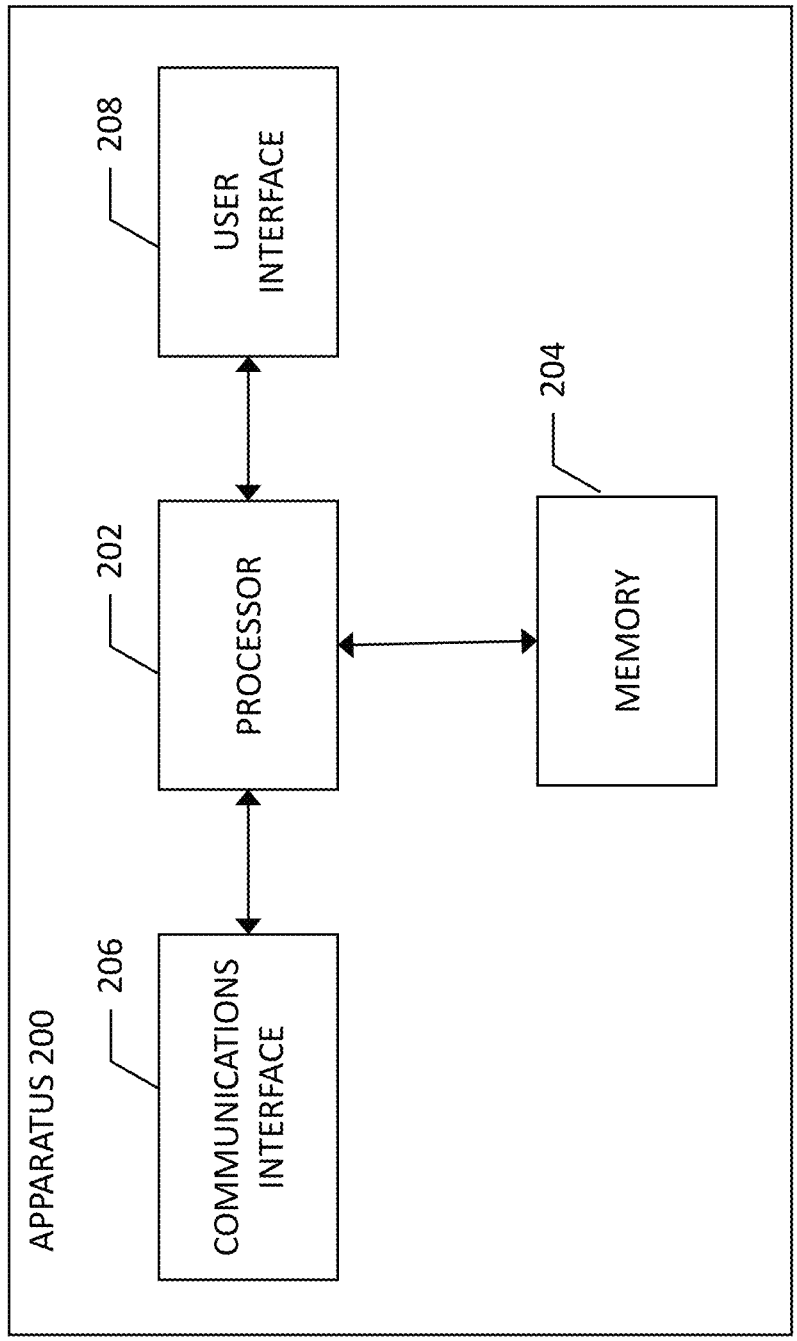
Figure 4:
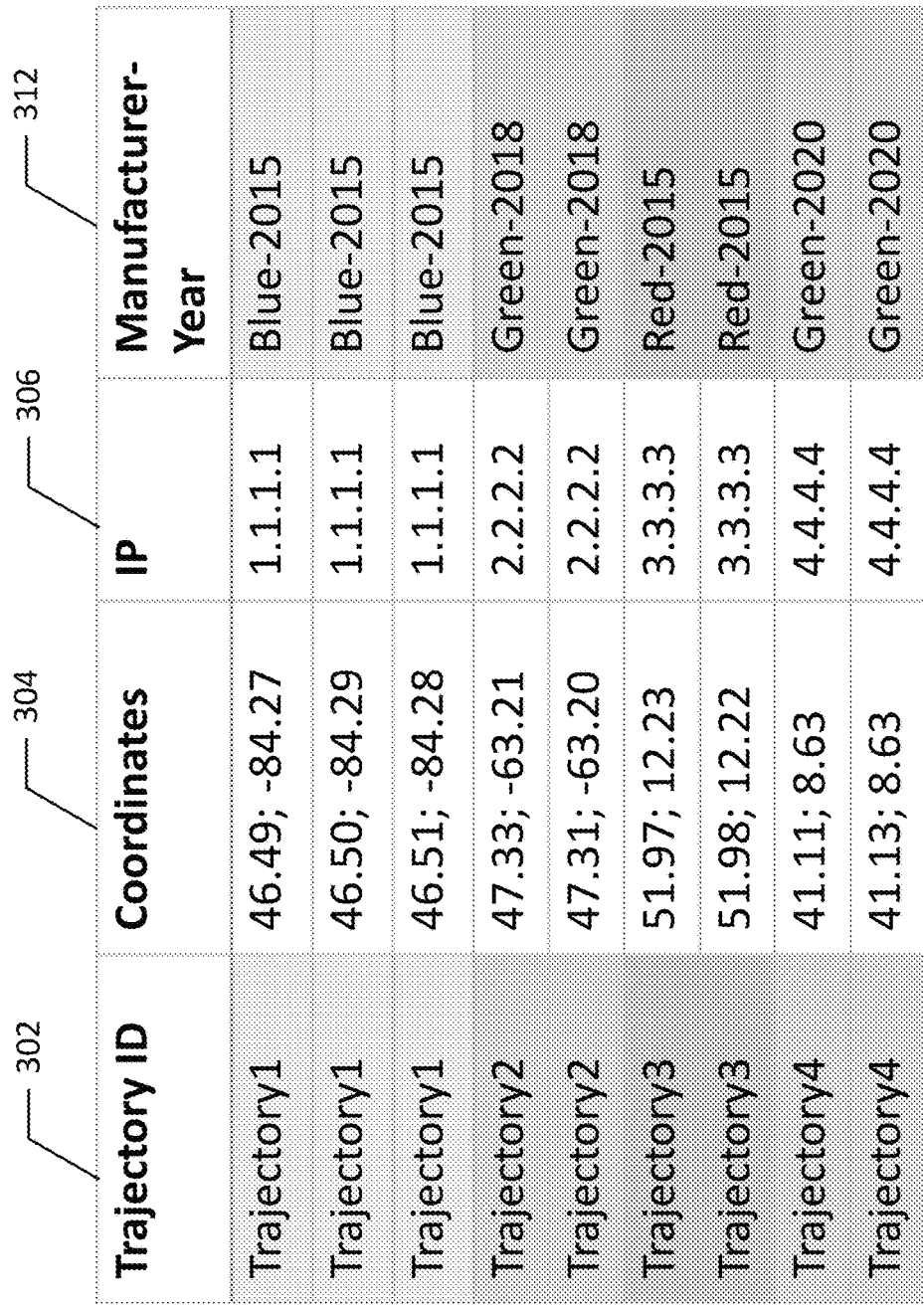
Figure 5:
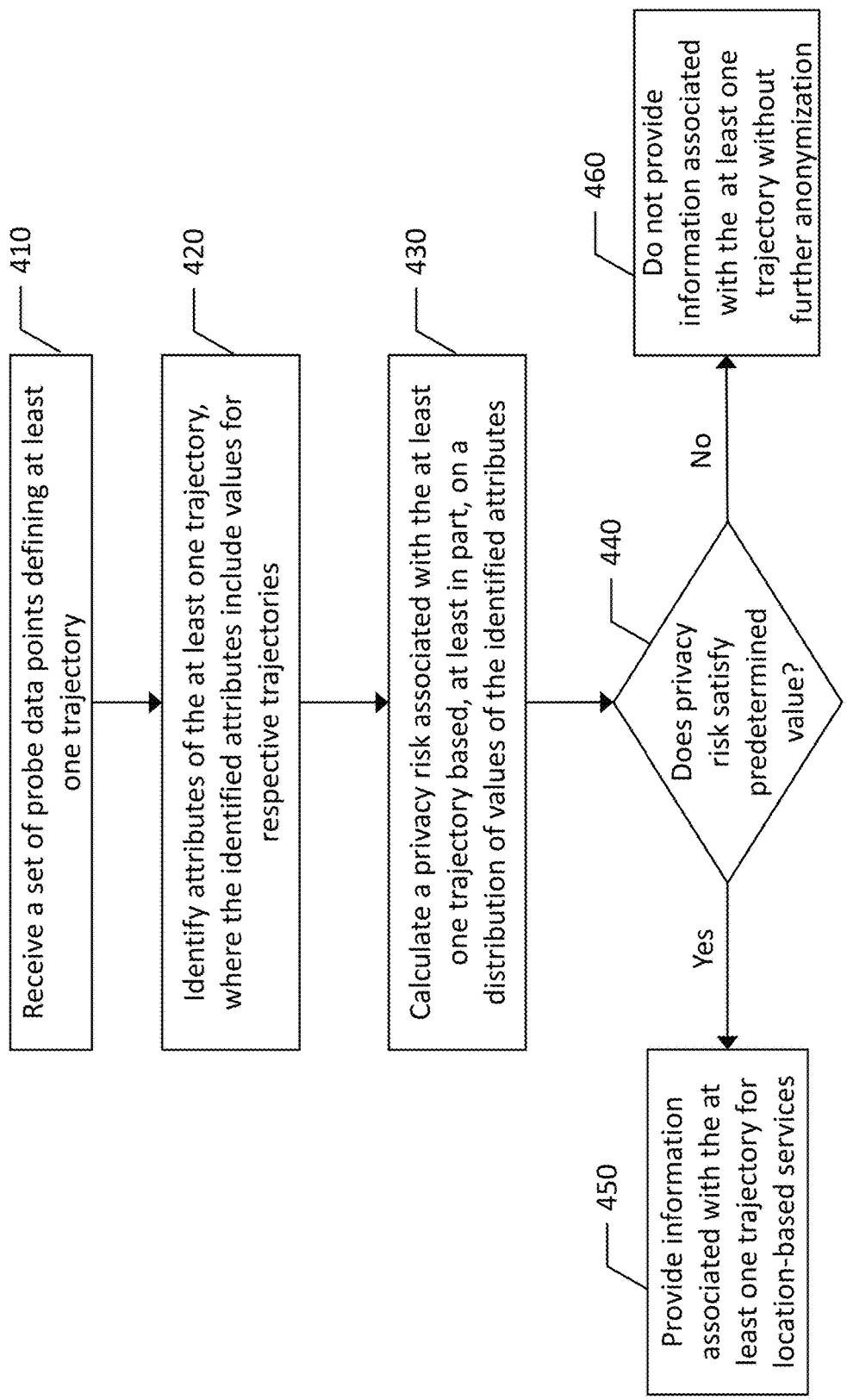

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for measuring and quantifying the privacy risk for disclosure of trajectory data based on one or more attributes of the trajectory data in accordance with an example embodiment of the present disclosure;

FIG. 3 illustrates probe data including a plurality of types of attributes according to an example embodiment of the present disclosure;

FIG. 4 illustrates probe data including a plurality of types of attributes including a combined attribute according to an example embodiment of the present disclosure; and FIG. 5 is a flowchart of a method for quantifying and measuring a privacy risk for disclosure of trajectory data according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes at least a latitude, longitude, and timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories (trajectory data) identifies the movement of a user over time. Anonymization of trajectories while providing sufficient information for location based services to be effective requires a balance to be struck between valuable trajectory information including location information of probe data points while also introducing ambiguity for anonymization. Various anonymization algorithms may be applied to trajectory data that obfuscates a source of the trajectory data, thereby preserving the anonymity of a user.

A method, apparatus, and computer program product are provided herein in accordance with an example embodiment for measuring and quantifying the privacy risk for disclosure of trajectory data, and more particularly, for measuring and quantifying the privacy risk for disclosure of trajectory data based on one or more attributes of the trajectory data. Trajectories for a vehicle and/or mobile device can facilitate the use of location-based services for a variety of functions. However, trajectories themselves may provide substantial information regarding an origin, destination, and path taken by a user associated with a vehicle or mobile device raising privacy concerns. Location-based services rely on accurate location information to provide the most accurate and relevant service. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which a measure is established that represents the privacy risk associated with trajectory data, where the privacy risk is the risk of identifying a source of trajectory data from the trajectory data based on one or more attributes of the trajectory data. Location information and more specifically, trajectory information data can be gathered and shared in a manner that anonymizes the source of the information and makes identification of the source difficult. Embodiments provided herein quantify and measure the privacy risk associated with trajectory data based on one or more attributes of the trajectory data. A measure of the privacy risk represents the ability of an adversary to associate the target trajectory with the source. Embodiments thereby determine how difficult it is estimated to be to establish to whom a target trajectory belongs. A privacy risk is a measure established as to the difficulty an adversary would have to associate a target trajectory with a source. If a privacy risk is low (e.g., below a predetermined threshold measure), information associated with the target trajectory may be provided to location-based services such that they may render a service related to the target trajectory and the source thereof.

To provide a method of measuring and quantifying the privacy risk for disclosure of trajectory data based on one or more attributes of the trajectory data, a system as illustrated in FIG. 1 may be used. FIG. 1 illustrates a communication diagram of an example embodiment of a system for implementing example embodiments described herein. The illustrated embodiment of FIG. 1 includes a map developer system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the user equipment may provide navigational assistance to a user among other services provided through access to the map developer 116. According to some embodiments, the map developer 116 may function as the OEM, such as when the map developer is a service provider to OEMs to provide map services to vehicles from that OEM. In such an embodiment, the map developer 116 may or may not be the recipient of vehicle probe data from the vehicles of that manufacturer. Similarly, the map developer 116 may provide services to mobile devices, such as a map services provider that may be implemented on a mobile device, such as in a mapping application. According to such an embodiment, the map developer 116 may function as the OEM as the map developer receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, functional class, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike routes, watercraft travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data (e.g., trajectory data), directly or indirectly, from a mobile device 114, such as when the map developer is functioning as the OEM 104. Optionally, the map developer 116 may receive probe data indirectly from the mobile device 114, such as when the mobile device 114 provides probe data to the OEM 104, and the OEM provides certain elements of the probe data to the map developer 116. The OEM 104 may anonymize the probe data or otherwise process the probe data to maintain privacy of a user of the mobile device 114 before providing the data to the map developer 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route to produce a trajectory of the vehicle. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for measuring and quantifying the linkability of trajectory data, and more particularly, to measuring and quantifying the linkability of trajectory data based on similarities to other trajectory data. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

The apparatus 200 of some embodiments may be integrated with or otherwise on-board the vehicle whereby the apparatus 200 may be equipped with or in communication with (e.g., via communications interface 206) one or more sensors, such as a Global Navigation Satellite System (GNSS) sensor (e.g., GPS, Galileo, GLONASS, etc.), accelerometer, image sensor, inertial measurement unit (IMU), gyroscope, magnetic field sensor, etc. Any of the sensors may be used to sense information regarding the location, movement, positioning, or orientation of the apparatus for use in identifying a location of the apparatus 200. In some embodiments, the apparatus 200 may derive information regarding location, movement, position, or orientation of the apparatus 200 based on communication signals perceived by the communications interface 206 such as through signal triangulation or signal fingerprinting, for example. In some embodiments, the apparatus may combine both sensor information and communication signals to drive a location of the apparatus 200.

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein measure and quantify the privacy risk for disclosure of trajectory data based on one or more attributes of the trajectory data. This privacy score represents the difficulty with which it is estimated that an adversary would be able to match the target trajectory with the source. Embodiments measure the privacy risk related to releasing a dataset containing mobility data in the form of information associated with a target trajectory. The risk relates to the personal information that can be inferred by comparing this data with other available data, such as additional trajectories.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data and information associated with trajectories to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations.

State-of-the-art anonymization algorithms reduce re-identification risk of trajectory data by blurring the relation between locations that may allow re-identification of the individual that produced the trajectory. For example, an adversary may re-identify a trajectory by noticing recurring patterns, such as overnight stays at the same address (likely the home) or periodic visits to a gym or hospital. These relations are blurred by subdividing trajectories in sub-trajectories with a new pseudonym, as the pseudonym is the attribute that connects seemingly independent location data points from a trajectory. For example, a trajectory that defines the movement of a person across multiple days may be split in multiple trajectories with different pseudonyms. Masking the relation between data in different days can hide repeated patterns such as overnight stays that can re-identify the person associated with the trajectory, such as by their home address.

An adversary may re-identify a trajectory based on additional attributes that strongly correlate with the trajectory. For example, trajectories produced by a brand new car could be re-identified by disclosing information about the year of production of the vehicle. Similarly, in a small town, a single individual may own a particular brand of car in the town, such that disclosing information about the brand of the car could identify the owner and could allow re-identification of associated trajectories.

Additionally, anonymization efforts may be hindered if other attributes of the data give away the relation that has been masked via splitting of a trajectory and pseudonymization. State-of-the-art measures of privacy risk consider the likelihood of re-identifying a trajectory from information about the mobility data such as speed, heading, locations, points-of-interest, etc. Information from additional attributes is not considered in the privacy risk.

According to example embodiments provided herein, privacy risk for a trajectory dataset is measured with respect to one or more attributes of the data (e.g., vehicle manufacturer, IP address, etc.). The risk associated to an attribute is proportional to the similarity between the distribution of its values in the data and the distribution of the values that represent that trajectory, such as the trajectory identifier. For example, the distribution of the attribute 'vehicle manufacturer' is similar to the distribution of trajectory identifiers, as each vehicle (trajectory) is produced by one manufacturer and this information does not change with time. On the other hand, it is likely that many vehicles in the data are produced by the same manufacturer, which mitigates the risk of the vehicle manufacturer attribute. As another example, a connected vehicle may be associated with an internet protocol (IP) address, which is changing any time the vehicle is shut down and any time the vehicle enters an area without signal (e.g., indoors). Additionally, IP addresses are unique, so one specific IP address refers to one and only one vehicle. Because of these features, the distribution of IP addresses will follow more closely to the distribution of trajectory identifiers. The risk can be measured on individual attributes or on combinations of attributes. For example, attributes 'vehicle manufacturer' and 'year of production' might, by themselves, not lead to significant risks, but combining this information may enable re-identification of one or more specific vehicles.

The attributes of probe data points that define one or more trajectories, as described above, can be categorical attributes with discrete values or measured attributes with floating point values. With respect to categorical attributes, privacy risks may be increased due to a potential lack of variety or distribution of the categorical values for the one or more trajectories. For example, in a geographic region with a single, prominent auto manufacturer, the vehicles within that region may be predominantly of the same prominent auto manufacturer. While drivers of vehicles made by the prominent auto manufacturer may enjoy reasonable privacy based on the brand of vehicle they drive since it is prolific, drivers of other vehicles may be in a small minority, and may be more readily identifiable by the manufacturer of their respective vehicles. A categorical attribute of vehicle manufacturer may thus not have a distribution of values that satisfies a predetermined threshold, below which the categorical attribute presents a privacy risk. Therefore, the categorical attribute of vehicle manufacturer may be discarded from probe data in the geographical region, and the remaining probe data attributes may be sufficient for establishing a low privacy risk when providing the probe data and trajectories thereof to location-based service providers.

Embodiments of the present disclosure provide a risk measurement tool to measure and quantify the privacy risk associated with trajectory data based on one or more attributes of the trajectory data. According to example embodiments provided herein, the risk measurement tool receives as input a dataset containing trajectory data. Trajectories are identified by an attribute of the data, which is referred to herein as 'trajectory ID'. The trajectory ID may not necessarily refer to a trajectory as it may, for example, refer to a credit card and to all purchases made by that card. Embodiments described herein can apply to such a scenario equally. The trajectory data may include additional attributes that are related to a trajectory, such as location coordinates, time, speed, vehicle manufacturer, year of production, IP address, and so on.

FIG. 3 is a table illustrating trajectories including trajectory data in the form of probe data points and attributes thereof. As shown, trajectory data can include a trajectory identifier 302 (Trajectory ID), a location 304 (Coordinates), an IP address 306 (IP), a manufacturer identifier 308 (Manufacturer), and a vehicle model year identifier 310 (Year). The privacy risk measurement tool of example embodiments described herein receives as input one or more attributes for which the risk should be computed. The first check is to verify the type of data. Categorical attributes have a higher risk of introducing risks than numerical (floating point) attributes as floating point typically represent measured properties that vary over time (e.g., sensor readings) and usually include noise (e.g., GPS readings). Categorical attributes, even if they have a very large range of possible values, are typically not subject to noise and therefore can be accurately compared with each other (e.g., IP addresses). Categorical attributes also typically represent attributes that have a discrete meaning, such as vehicle manufacturer or vehicle model year, for example.

According to example embodiments described herein, the privacy risk is calculated based on a comparison of the distribution of the trajectory identifier with the distribution of the attribute. Specifically, the similarity between how distinct values change in both attributes are measured. Different ways of measuring these similarities can be combined into a single privacy risk score in order to evaluate the risk from multiple perspectives. A value of the risk score can be calculated for each trajectory, depending on the values in the attribute associated to the respective trajectory. Optionally, the risk can be calculated for each attribute value, depending on the trajectory identifiers associated to that value. These values can then be averaged to produce the value for one entire attribute/column and for the entire dataset.

According to some embodiments, an analysis of an entire dataset of trajectories may be performed to determine if the dataset can be used for provision of location-based services without incurring a substantial privacy risk. The risk for each attribute of the trajectories of the dataset and/or the risk of the combined attributes of the trajectories of the dataset can be averaged to produce a value for the entire dataset either by attribute or by combined attributes of the trajectories of the dataset. While a particular attribute may appear to pose a privacy risk when evaluated on its own, the attribute within a dataset of a plurality of trajectories may prove to not have a substantial privacy risk. For example, using the scenario described above where a geographic region is associated with a particular vehicle manufacturer (and home to a manufacturing facility), the vehicles in that region may primarily be of the particular vehicle manufacturer. While specific vehicles and model years from this manufacturer may be relatively uncommon in some regions, in the geographic region associated with the particular vehicle manufacturer the specific vehicles and model years may be very common, such that vehicle attributes that independently appear to pose a privacy risk do not pose a privacy risk in this particular population. Thus, a dataset of trajectories from the geographic region of the particular vehicle manufacturer including vehicle attributes may not pose a privacy risk, and the dataset of trajectories may be provided to location-based service providers including the attributes.

The distribution of IP addresses changes in the same manner as the distribution of trajectory identifiers according to the table of FIG. 3, as there is a one-to-one correspondence between the IP addresses 306 and the trajectory identifiers 302. The manufacturer identifier 308 does not reproduce the same distribution as the trajectory identifier 302 as trajectory identifiers Trajectory2 and Trajectory4 refer to vehicles produced by the same manufacturer as shown as Green in both instances. Similarly, trajectory identifiers Trajectory1 and Trajectory3 refer to vehicles produced in the same year as shown through the model year identifier 310.

If multiple attributes are received, a new attribute may be produced by combining values from the multiple attributes, such as by appending one value to another or by computing a hash of the values. This is illustrated as "Manufacturer-Year" for the manufacturer and model year combined identifier 312 in FIG. 4 reflecting a combination of the manufacturer identifier 308 and the model year identifier 310 from FIG. 3. The privacy risk may then be calculated on the new combined attribute. Combinations of attributes may involve greater risk than the components taken individually, such as a vehicle manufacturer and model year may not by themselves lead to significant risks, but combining the information may allow re-identification thereby increasing the privacy risk.

Another example of combining attributes may include attributes containing GPS coordinates and time could lead to the common scenario where privacy risk is computed over locations. The risk can be calculated on a raw dataset to evaluate if any attribute might be strongly associated to a trajectory and could therefore allow for re-identification of the trajectory if it were released along with the data. The privacy risk can also be calculated on a raw dataset to verify if any attribute might undermine anonymization (splitting trajectories and pseudonymization) once it is applied and the data is released. Optionally, risk could be calculated on anonymized data to identify trajectories that share common attributes and that might be related to the same trajectory in the raw data.

The privacy risk of embodiments described herein can be calculated on subsets of the data, such as sub-trajectories that are related to sensitive locations and that must therefore be carefully anonymized. Such evaluation may identify additional mitigations that are required alongside anonymization to prevent re-identification of these sensitive areas.

Once a privacy risk has been quantified and measured, the privacy risk can inform additional mitigation strategies. If the privacy risk is high throughout an entire attribute, such as IP addresses that are consistently related to a vehicle, the entire attribute column may be removed from the data. If the privacy risk is high for only specific rows with a specific attribute value or trajectories, the attribute data for these specific rows can be deleted such as by replacement with a placeholder or artificial value, or the entire row or trajectory can be removed from the data. If the privacy risk is high in a combine attribute, such as an attribute that includes the name of a web browser and the IP address, where only the IP address has high risk, the attribute values may be modified or filtered to remove parts that are sensitive and leave parts that are not.

The quantified and measured privacy risk generated by example embodiments herein may be used to determine further actions. For example, if the privacy risk satisfies a predetermined criterion (e.g., meeting a minimum privacy risk score), this indicates that the risk of linking the target trajectory with the source is low, and the target trajectory or information associated with the target trajectory may be published to a location-based service provider. If a privacy risk score fails to satisfy a predetermined criteria, the risk of linking the target trajectory with the source may be too high, and further actions may be taken. For example, if the privacy risk is too high, the target trajectory or information associated with the target trajectory may be further anonymized, such as by using an anonymization algorithm (e.g., splitting and gapping) on the target trajectory to reduce the privacy risk and improve the privacy score.

FIG. 5 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 5 illustrates a method for measuring and quantifying the privacy risk for disclosure of trajectory data, and more particularly, for measuring and quantifying the privacy risk for disclosure of trajectory data based on one or more attributes of the trajectory data. A set of probe data points defining at least one trajectory is received at 410. The set of probe data points may be received, for example, by an OEM 104 from a vehicle or mobile device 114. The probe data points may include at least a location (e.g., latitude and longitude) and a time stamp. Attributes of the at least one trajectory are identified at 420, where the identified attributes include values for respective trajectories. At 430, a privacy risk score associated with the at least one trajectory is calculated based, at least in part, on a distribution of values of the identified attributes. A determination is made at 440 as to whether the privacy risk satisfies a predetermined value. Said differently, an evaluation is made as to the likelihood of the source of a trajectory can be identified from the trajectory data. The predetermined value may be a value that is determined to represent sufficient privacy between the trajectory information and the source of the trajectory. If the privacy risk satisfies the predetermined value, information associated with the trajectory may be shared with location-based services at 450. If the privacy risk fails to satisfy the predetermined value, information associated with the trajectory is not shared without further anonymization as shown at 460.

In an example embodiment, an apparatus for performing the method of FIG. 4 above may comprise a processor (e.g., the processor 202) configured to perform some or each of the operations (410-460) described above. The processor may, for example, be configured to perform the operations (410-460) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-460 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
receive probe data points defining at least one trajectory;
identify attributes of the at least one trajectory, wherein the identified attributes comprise values for respective trajectories;
calculate a privacy risk associated with the at least one trajectory based, at least in part, on a distribution of values of the identified attributes, wherein the privacy risk comprises a measure of difficulty in identifying a source of the at least one trajectory; and
provide information associated with the at least one trajectory for location-based services in response to the privacy risk satisfying a predetermined value.

2. The apparatus of claim 1, wherein the attributes of the at least one trajectory comprise two or more types of attributes, wherein at least one type of attribute comprises a categorical attribute of discrete values.

3. The apparatus of claim 2, wherein at least one type of attribute comprises a measured property, wherein the measured property type of attribute comprises floating point values.

4. The apparatus of claim 3, wherein causing the apparatus to identify the attributes of the at least one trajectory further comprises causing the apparatus to:
combine at least two types of attributes of the two or more types of attributes into a combined attribute,
wherein causing the apparatus to calculate the privacy risk associated with the at least one trajectory based, at least in part, on the distribution of values of the identified attributes comprises causing the apparatus to calculate the privacy risk associated with the at least one trajectory based, at least in part, on a distribution of values of the combined attribute.

5. The apparatus of claim 4, wherein causing the apparatus to combine at least two types of attributes of the two or more types of attributes into the combined attribute comprises causing the apparatus to calculate a hash on values of the combined at least two types of attributes.

6. The apparatus of claim 5, further comprising:
re-calculate the privacy risk associated with the at least one trajectory based, at least in part, on the combined attribute.

7. The apparatus of claim 2, wherein causing the apparatus to calculate the privacy risk associated with the at least one trajectory based, at least in part, on the distribution of values of the identified attributes comprises causing the apparatus to:
    determine a distribution of values for at least one of the two or more types of attributes;
    discard the at least one of the two or more types of attributes in response to the distribution of values for at least one of the two or more types of attributes failing to satisfy a predefined threshold; and
    calculate the privacy risk associated with the at least one trajectory based, at least in part, on the distribution of values of the identified attributes without the discarded at least one of the two or more types of attributes.

8. A computer program product comprising at least one non-transitory computer-readable storage medium having computer-executable program code portions stored therein, the computer-executable program code portions comprising program code instructions configured to:
    receive probe data points defining at least one trajectory;
    identify attributes of the at least one trajectory, wherein the identified attributes comprise values for respective trajectories;
    calculate a privacy risk associated with the at least one trajectory based, at least in part, on a distribution of values of the identified attributes, wherein the privacy risk comprises a measure of difficulty in identifying a source of the at least one trajectory; and
    provide information associated with the at least one trajectory for location-based services in response to the privacy risk satisfying a predetermined value.

9. The computer program product of claim 8, wherein the attributes of the at least one trajectory comprise two or more types of attributes, wherein at least one type of attribute comprises a categorical attribute of discrete values.

10. The computer program product of claim 9, wherein at least one type of attribute comprises a measured property, wherein the measured property type of attribute comprises floating point values.

11. The computer program product of claim 10, wherein the program code instructions to identify the attributes of the at least one trajectory further comprise program code instructions to:
    combine at least two types of attributes of the two or more types of attributes into a combined attribute;
    wherein the program code instructions to calculate the privacy risk associated with the at least one trajectory based, at least in part, on the distribution of values of the identified attributes comprise program code instructions to calculate the privacy risk associated with the at least one trajectory based, at least in part, on a distribution of values of the combined attribute.

12. The computer program product of claim 11, wherein the program code instructions to combine at least two types of attributes of the two or more types of attributes into the combined attribute comprise program code instructions to calculate a hash on values of the combined at least two types of attributes.

13. The computer program product of claim 12, further comprising program code instructions to:
    re-calculate the privacy risk associated with the at least one trajectory based, at least in part, on the combined attribute.

14. The computer program product of claim 9, wherein the program code instructions to calculate the privacy risk associated with the at least one trajectory based, at least in part, on the distribution of values of the identified attributes comprise program code instructions to:
    determine a distribution of values for at least one of the two or more types of attributes;
    discard the at least one of the two or more types of attributes in response to the distribution of values for at least one of the two or more types of attributes failing to satisfy a predefined threshold; and
    calculate the privacy risk associated with the at least one trajectory based, at least in part, on the distribution of values of the identified attributes without the discarded at least one of the two or more types of attributes.

15. A method comprising:
    receiving probe data points defining at least one trajectory;
    identifying attributes of the at least one trajectory, wherein the identified attributes comprise values for respective trajectories;
    calculating a privacy risk associated with the at least one trajectory based, at least in part, on a distribution of values of the identified attributes, wherein the privacy risk comprises a measure of difficulty in identifying a source of the at least one trajectory; and
    providing information associated with the at least one trajectory for location-based services in response to the privacy risk satisfying a predetermined value.

16. The method of claim 15, wherein the attributes of the at least one trajectory comprise two or more types of attributes, wherein at least one type of attribute comprises a categorical attribute of discrete values.

17. The method of claim 16, wherein at least one type of attribute comprises a measured property, wherein the measured property type of attribute comprises floating point values.

18. The method of claim 17, wherein identifying the attributes of the at least one trajectory further comprises.
    combining at least two types of attributes of the two or more types of attributes into a combined attribute,
    wherein calculating the privacy risk associated with the at least one trajectory based, at least in part, on the distribution of values of the identified attributes comprises calculating the privacy risk associated with the at least one trajectory based, at least in part, on a distribution of values of the combined attribute.

19. The method of claim 18, wherein combining at least two types of attributes of the two or more types of attributes into the combined attribute comprises calculating a hash on values of the combined at least two types of attributes.

20. The method of claim 16, wherein calculating the privacy risk associated with the at least one trajectory based, at least in part, on the distribution of values of the identified attributes comprises:
    determining a distribution of values for at least one of the two or more types of attributes;
    discarding the at least one of the two or more types of attributes in response to the distribution of values for at least one of the two or more types of attributes failing to satisfy a predefined threshold; and
    calculating the privacy risk associated with the at least one trajectory based, at least in part, on the distribution of values of the identified attributes without the discarded at least one of the two or more types of attributes.

21. The method of claim 15 further comprising:
prohibiting provision of information associated with the at least one trajectory for location-based services in response to the privacy risk failing to satisfy a predetermined value.

22. The method of claim 15, wherein the at least one trajectory comprises a plurality of trajectories, the method further comprising:
calculating a privacy risk associated with the plurality of trajectories based, at least in part, on the distribution of values of the identified attributes across a dataset of the plurality of trajectories,
wherein providing information associated with the at least one trajectory for location-based services in response to the privacy risk satisfying the predetermined value comprises providing information associated with the dataset of the plurality of trajectories for location-based services in response to the privacy risk associated with the plurality of trajectories satisfying the predetermined value.

* * * * *